(12) United States Patent
Romagnoli et al.

(10) Patent No.: US 7,013,184 B2
(45) Date of Patent: Mar. 14, 2006

(54) FIELDBUS DEVICE

(75) Inventors: Mauro Romagnoli, Laglio (IT); Giorgio Saldarini, Moltrasio (IT)

(73) Assignee: ABB Service S.R.L., (IT)

( * ) Notice: Subject to any disclaimer, the term of this patent is extended or adjusted under 35 U.S.C. 154(b) by 0 days.

(21) Appl. No.: 10/747,155

(22) Filed: Dec. 30, 2003

(65) Prior Publication Data
US 2004/0153176 A1  Aug. 5, 2004

(30) Foreign Application Priority Data
Dec. 31, 2002 (IT) .................. BG2002A00457

(51) Int. Cl.
*G05B 11/01* (2006.01)

(52) U.S. Cl. ................. 700/17; 700/18; 700/19; 700/20; 709/201; 709/228

(58) Field of Classification Search ............ 700/17–20, 700/83–84; 709/201, 220, 223, 228
See application file for complete search history.

(56) References Cited

U.S. PATENT DOCUMENTS

| | | | |
|---|---|---|---|
| 5,841,654 A * | 11/1998 | Verissimo et al. ............. 700/83 |
| 5,978,850 A * | 11/1999 | Ramachandran et al. ... 709/228 |
| 6,574,561 B1 * | 6/2003 | Alexander et al. ............. 702/5 |
| 6,618,745 B1 * | 9/2003 | Christensen et al. ........ 709/201 |
| 6,889,166 B1 * | 5/2005 | Zielinski et al. ............ 702/183 |
| 2002/0065631 A1 * | 5/2002 | Loechner .................... 702/188 |
| 2003/0006989 A1 * | 1/2003 | Konrad et al ............... 345/440 |
| 2004/0070599 A1 * | 4/2004 | Mori et al. ................. 345/735 |

\* cited by examiner

*Primary Examiner*—Anthony Knight
*Assistant Examiner*—Ronald D. Hartmann, Jr.
(74) *Attorney, Agent, or Firm*—Connolly, Bove, Lodge & Hutz LLP

(57) ABSTRACT

A field device that enables display of information corresponding to a Fieldbus network. The field device provides the capability to take over a Link Active Scheduler function on the Fieldbus network. The field device comprises means far connection to a Fieldbus network and information-display. The information-display means comprises physical-display means; and means for logical connection of the field device on the Fieldbus network. In addition, the information-display means further comprises logic means for choice and display.

19 Claims, 5 Drawing Sheets

FIELDBUS DEVICE

FIELD OF THE INVENTION

The present invention relates to process-control systems, and in particular to control systems equipped with a communication system of the Fieldbus type.

BACKGROUND OF THE INVENTION

Traditional process-control systems normally comprise three hierarchical levels. There is, typically, the first (lowest) level of the field devices, for instance, sensors and actuators, which represent the primary interface with the process to be controlled. The second level is constituted by control devices (controllers, PLCs, etc.), which on the basis of information received from the field devices, decides in real time which actions are to be carried out on the actuators in order to achieve given control targets, such as, for example, maintenance of given process variables within pre-set values. The control devices can then communicate with a further level of supervision, in which one or more consoles enable the operator to display the state of the process and possibly issue commands for carrying out manoeuvres, such as activating or de-activating part of the plant or system or setting the value that one or more variables present in the system must reach and maintain.

The field devices are usually physically distributed in the plant. Typically, amongst field devices it is typically possible to number sensors, i.e., devices that can measure one or more process variables (pressure, temperatures, flow-rate, etc.), and actuators, i.e., devices that can act on the process to modify the behaviour thereof (motors, valve positioners, switches, etc.). Note that there exist other types of sensors or actuators used in process-control devices, for example, sensors for measuring the internal temperature in a field device, but in what follows by sensor or actuator is meant specifically just one sensor or actuator directly interfaced with the process, i.e., a sensor that measures one of the process variables or an actuator that acts directly on the process.

In traditional control systems, communication between the field devices and the control devices occurs by means of direct connection between each field device and a control device.

Recently, there have been introduced communication systems that have enabled introduction of a different architecture of the control system. In particular, reference is made here to the communication system defined by the Fieldbus Foundation protocol (in what follows referred to simply as Fieldbus). Using this protocol, a communication network can be obtained between field devices (Fieldbus network), in which said devices exchange directly information without necessarily passing through the second hierarchical level (control level). Rather, the two highest hierarchical levels (control level and supervision level) can advantageously also be connected to the Fieldbus network, exchanging information, on principle, with all the devices connected to said network.

The Fieldbus protocol has introduced a series of technological innovations that enable an increase in the functional capacities of the units (transmitters, actuators). For the present description, just two characteristics/concepts are considered: Function Blocks and Backup LAS (Link Active Scheduler).

The Function Blocks can be considered as parts of software that carry out functions of different nature, such as: measurement algorithms, calculation or control algorithms, input selectors, etc. They are, in general, means for logico-mathematical processing of information.

The concept of Function Blocks enables availability of units, which, in addition to the typical functions for measuring the quantities that they are designed to measure (pressure, temperature, etc.), may contain functions for more general control operations not necessarily dependent upon or linked to the primary function of the device itself.

For example, a temperature transmitter may contain blocks having functions of the PID, mathematical, signal-characterizer type, etc., which are not necessarily linked to the measurement of temperature.

The fact of having transmitters with these different functions "on board" enables the process control to be performed directly between the devices of the field themselves (distribution of control in the field), instead of it being performed in the context of the central-system controller (HOST), as is the case with traditional instrumentation.

In addition, the above capability of Fieldbus units affords considerable flexibility in the control strategy because a Function Block contained in a transmitter could be used within the control of a process in which the transmitter itself does not contribute with its own measurement but just offers a function of which it is the container.

When in a Fieldbus network the Function Blocks are used, it is necessary, in the stage of configuration of the control system, to specify, for each input variable of a Function Block, from which other Function Block said variable comes. In practice, for example, if the Function Block FB1 contained in the device A needs to use the variable 7 generated by the Function Block FB2 contained in the device B, in the configuration stage, it will be necessary to specify that one of the "inputs" of the Function Block FB1 is "logically connected" to the output 7 of the Function Block FB2.

Note that, on the basis of this architecture, in order to recognize what a given variable present on the network refers to, it is necessary to specify in which device said variable has been produced and, more specifically, in which Function Block of the device in question. This can be done in a unique way using the Tags, i.e., alphanumeric strings which are associated to each device and to each Function Block.

The communications and the execution of the Function Blocks must be regulated and scheduled organically to achieve 'determinism' in the communication. For example, the one and the same measurement of pressure must be acquired/sampled always at the same instant within a control loop (Macrocycle), hence at a constant rate, and, consequently, it must be transmitted only when it has actually been processed and updated with a new value. The same applies to all the variables that are results or outputs of processing of the Function Blocks.

The above scheduling function is carried out by the LAS (Link Active Scheduler) or bus arbiter. LAS is a function of co-ordination of a Fieldbus network. It is a sort of master activity which manages the Fieldbus activity and may be redundant on one and the same communication network. Normally, the Primary LAS resides in devices having resources, in terms of capacity and speed of calculation, superior to those of a transmitter. Such devices may be, for example, a Linking Device or the central control system itself, and carry out scanning/scheduling of the functions and communications for the process control, irrespective of the fact that these communications or functions are carried out in the transmitters or in the controller of the system itself.

In a standard configuration of this type, where the LAS is active in the control system, there is the possibility of monitoring everything that takes place during the process on the operator's console. There can be displayed the various process variables measured by the various transmitters, as likewise the position of the valve, etc.

A further concept known in the field of Fieldbus networks is the LAS function as a function that can be carried out also by the Fieldbus transmitters. For reasons of safety, management, etc., it is deemed preferable that both devices having LAS capability and devices containing specific Function Blocks for measurement (sensors) or for actuation (actuators) are used just for one of the two functions, i.e., either as Backup LAS or for contributing with their Function Blocks to control loops.

The capability of a transmitter for being activated as a LAS is normally used as Backup of the Primary LAS described above, because the LAS developed within field units or devices is in actual fact a subset of the functions of the primary LAS of a master. Typically, a field device does not present the time-distribution capability for periodic synchronisation of all the Fieldbus units of the network.

A problem of the known art lies in the fact that many transmitters are installed in points of the plant or system that are hard to access. Consequently, even though these devices are equipped with displays of their own, reading of said displays is in fact impossible. This problem becomes particularly serious in the case where a device operating as Primary LAS in a control system fails. In this case, in fact, it is possible to maintain the control loop active only if a second LAS, in this case the Backup LAS, has been provided in the configuration stage. In this case, the transmitter with LAS capabilities, configured for constituting the backup of the system, realizes that the Primary LAS has failed and takes over the job of maintaining active both scheduling of the Function Blocks and scheduling of the communications for the other transmitters of the network that contribute with their Function Blocks to said control loop. This, however, occurs in a blind way from the standpoint of monitoring of what is happening in field. The console is no longer active, and it can only be assumed that the control loop is effectively continuing to operate because it is managed by the Backup LAS active on one of the transmitters of the network.

In the case of failure of the Primary LAS, for displaying the information on the network it would now be possible to use a PC connected to the Fieldbus network and equipped with an appropriate software. This solution presents the disadvantage that a PC is not suitable for fixed in-field installation, in so far as it is not equipped with the necessary protections against dust and water that are typically required of in-field installed devices. In particular, there is typically required a degree of protection IP65 or higher, as defined by CENELEC (European Committee for Electrotechnical Standardization). Alternatively, if the NEMA (National Electrical Manufacturers' Association) directives are used, the device is required to meet a degree of protection NEMA 4 or higher. Current PCs are not pre-arranged for meeting the above requirements. In the case of installation in environments that are dangerous on account of the presence of explosive gases and powders, other types of certification are envisaged, such as, for example, EEx. There fall within this category the certifications EEx d for the explosion test (casing or housing or container of the device) and EEx i for electrical protections and intrinsic safety. In the case in point, for Fieldbus-Foundation instruments, typically reference is made to the two standards ENTITY and FISCO.

A further problem inherent in the known art is that using the Backup-LAS function in a sensor or an actuator, albeit technically possible, risks overloading these devices, which normally, for technical reasons and reasons of cost, are not provided with a high calculation power.

The above limit on the calculation power also implies that, even though also in this case there do not exist a priori theoretical limits, sensors and actuators have in effect a limited capability of execution of Function Blocks.

SUMMARY OF THE INVENTION

The main task of the present invention is to provide a field device which will enable display of information corresponding to a Fieldbus network in a manner that is irrespective of the physical position of sensors and actuators.

A further purpose of the present invention is to provide a field device that will be able to take over a Backup-LAS function, likewise enabling in-field display of information on the Fieldbus network.

Yet a further purpose is to provide a device that will enable execution of Function Blocks without involving any additional computational burden of the sensors and actuators present in the system.

The above task, as well as the above and other purposes that will emerge more clearly in what follows, are achieved by a field device for industrial environments, comprising means for connection to a Fieldbus network and information-display means, wherein said information-display means comprise: physical-display means, means for logical connection of the device to items of information available on the Fieldbus network, and logic means for choice and display of one or more of said items of information on said physical means. Said device can advantageously be pre-arranged for performing Backup-LAS functions. Moreover, said device can contain Function Blocks.

In practice, in this way, a device is obtained that performs fully the pre-set tasks and purposes.

BRIEF DESCRIPTION OF THE DRAWINGS

Further characteristics and advantages will emerge more evidently from the description of preferred, but non-exclusive, embodiments of the device according to the invention, illustrated by way of indicative and non-limiting example in the annexed drawings, which are described in what follows.

DESCRIPTION OF THE PREFERRED EMBODIMENTS

Figure 1:
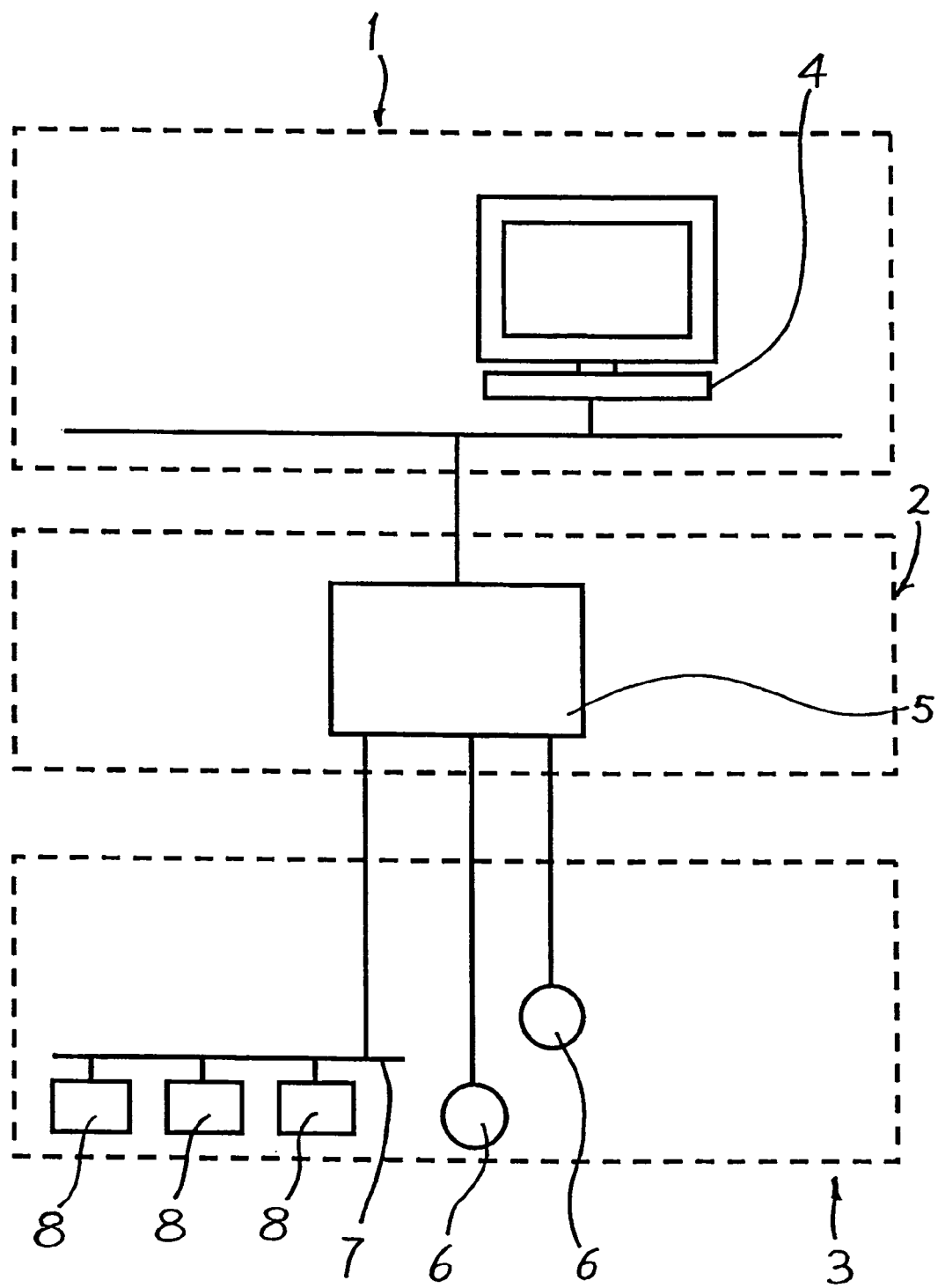
FIG. 1 illustrates a typical control system. The reference numbers 1, 2 and 3 represent three hierarchical levels: level 1 is the supervision level, and contains within it a console 4; level 2 is the level of the control devices, in which a controller 5 is represented; level 3 is the level of the field devices, and represented therein are the traditional devices 6, with a direct connection to the controller. Further represented are devices 8 equipped with Fieldbus communication, which communicate with one another and with the second hierarchical level by means of a Fieldbus communication network 7.
Figure 2:
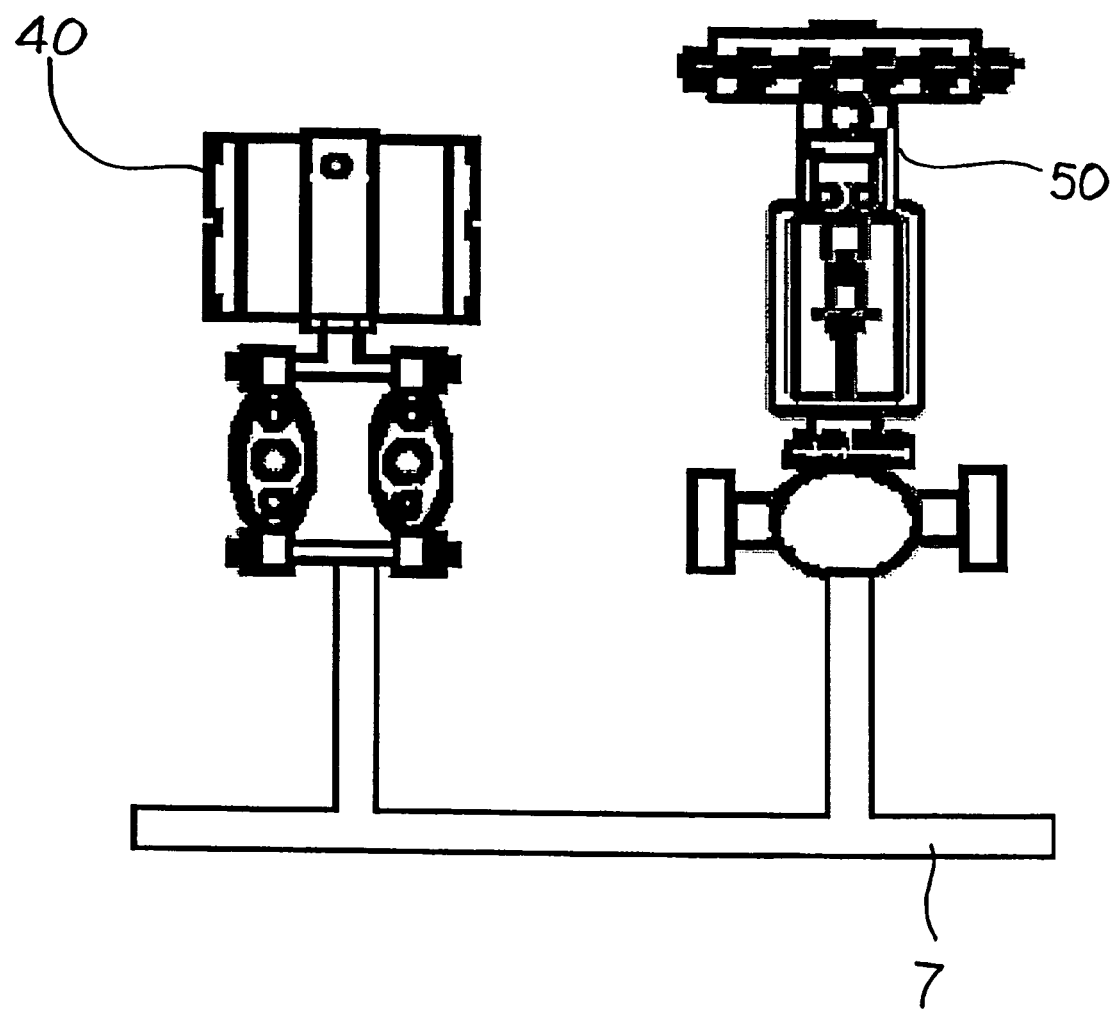
FIG. 2 represents a portion of the Fieldbus communication network 7, connected to which are a field device of a transmitter type 40 and a field device of a valve type 50.
Figure 3:
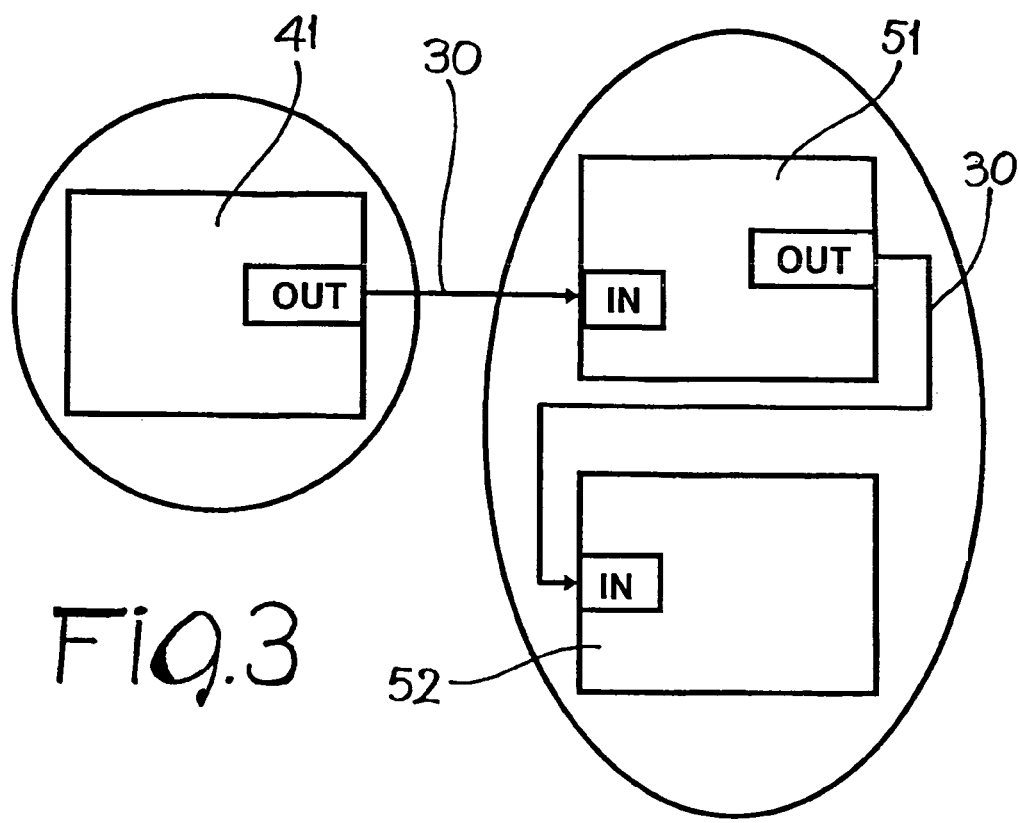
FIG. 3 is a logic representation of the portion of Fieldbus network represented in FIG. 2. In particular, the reference number 41 designates a Function Block contained in the transmitter 40, whilst 51 and 52 designate two Function Blocks contained in the valve 50. The connections 30 designate logical connections (typically defined in the stage of configuration of the control system), which connect logically Function Blocks present in the system.
Figure 4:
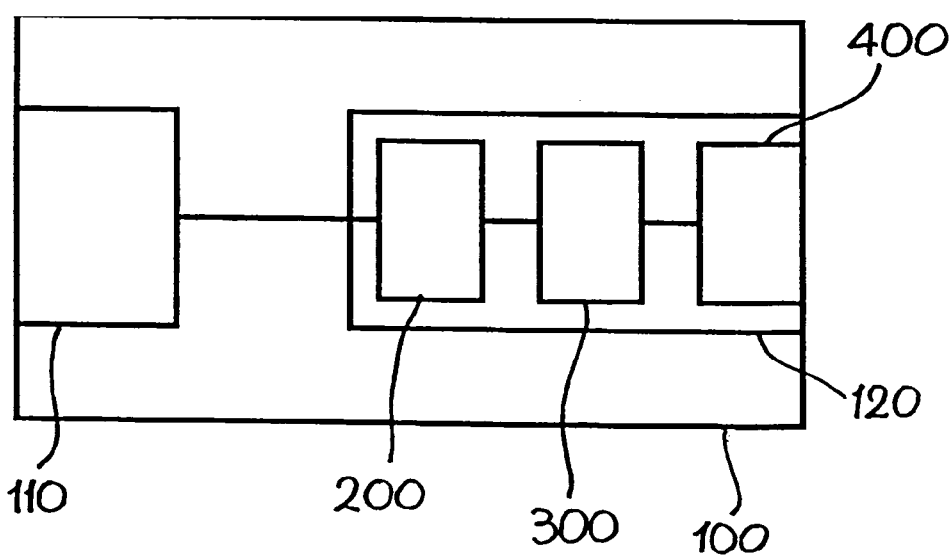
FIG. 4 is a schematic representation of an embodiment of the device 100 according to the invention. The device comprises means for connection to a Fieldbus network 110 and information-display means 120. In turn, said information-display means comprise: physical-display means 400, means for logical connection of the device to items of information available on the Fieldbus network 200, and logic means for choice and display of one or more of said items of information on said physical means 300.
Figure 5:
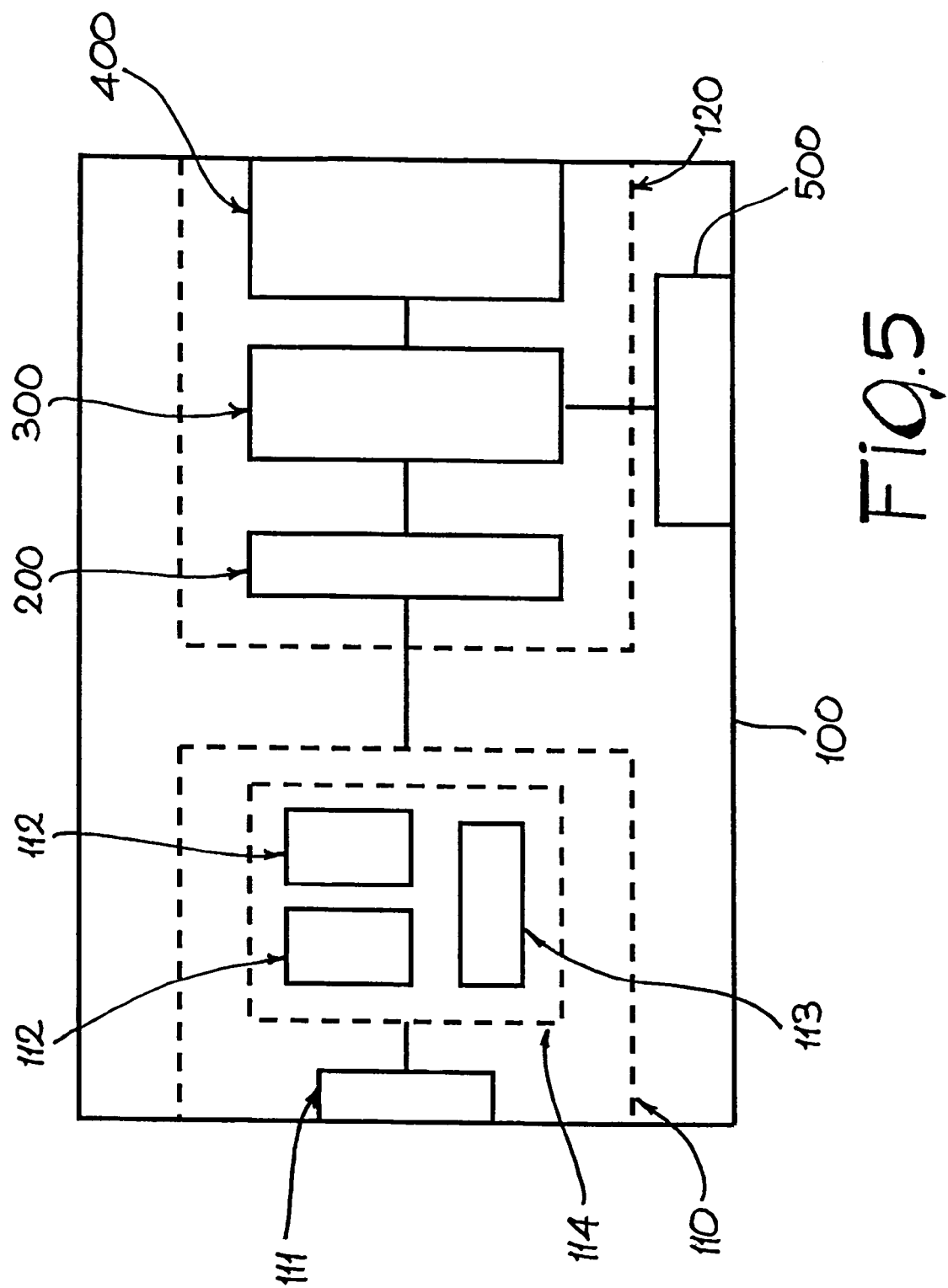
FIG. 5 is a schematic representation of a further embodiment of the device 100 according to the invention. The device comprises means for connection to a Fieldbus network 110, information-display means 120, and a keypad 500. The information-display means 120 comprise: physical-display means 400, means for logical connection of the device to items of information available on the Fieldbus network 200, and logic means for choice and display of one or more of said items of information on said physical means 300, which are also driven by means of the keypad 500. The means for connection to the Fieldbus network 110 comprise connection physical means 111 and connection logic means 114. In turn, the logic means 114 comprise two Function Blocks 112 and a LAS 113.
Figure 6:
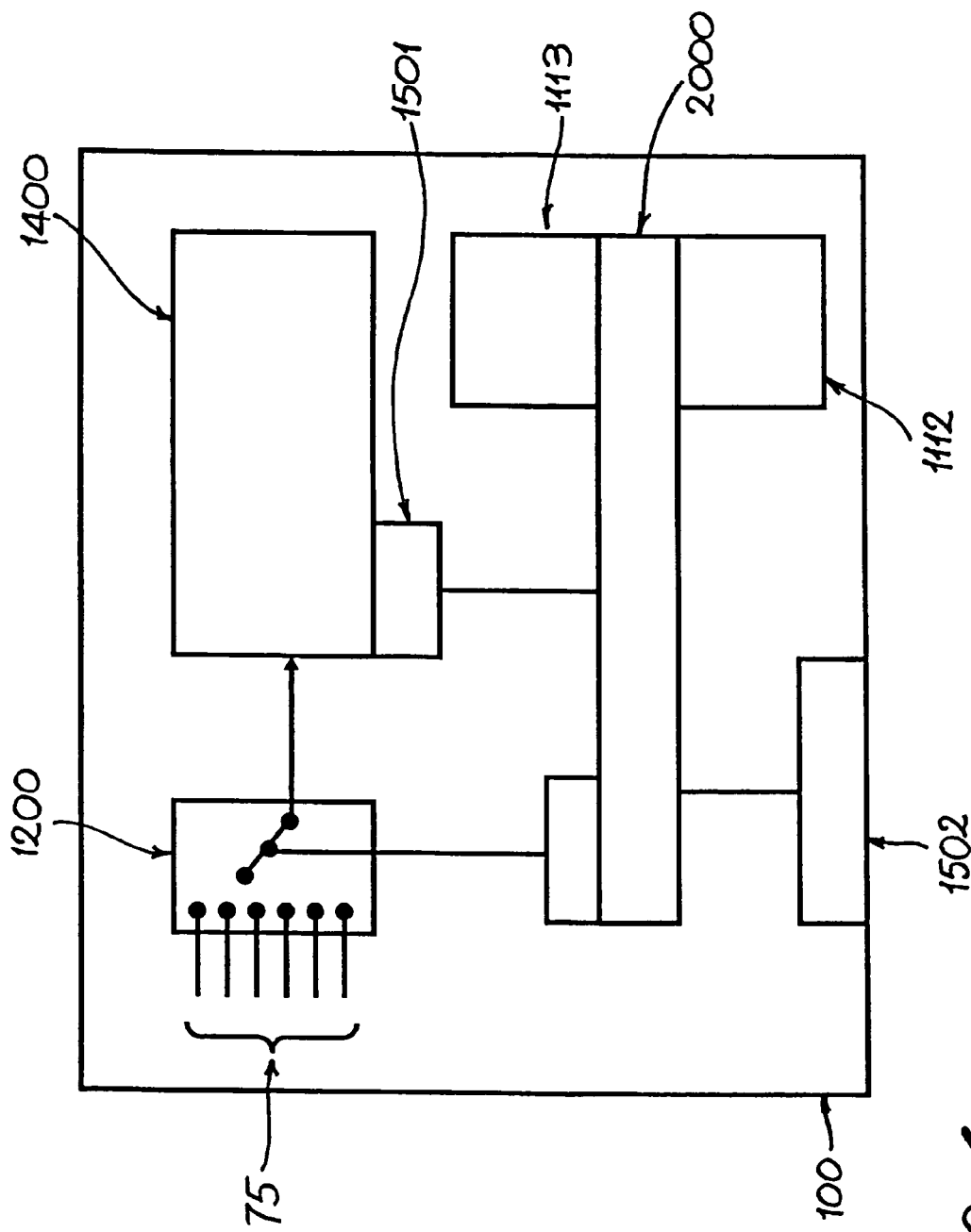
FIG. 6 illustrates a further embodiment of the device according to the invention 100, in which there are present: a multiple-input Function Block 1200; a dot-matrix display 1400; a Backup-LAS function 1113; a container of Function Blocks 1112; which can contain one or more Function Blocks; and a keypad, herein usefully divided into a local part, attached to the display 1501, and keys external to the outermost container of the device 1502 that enable acting on the device even in the case where this is sealed to guarantee characteristics of environmental insulation (IP, NEMA, EEx, ENTITY, FISCO).

With reference to the above figures, the device according to the invention is suitable for installation in the industrial environment. This means that the device is equipped with a container that guarantees an adequate level of protection from liquids and dusts so as to enable its free installation in an industrial environment. According to the requirements of the plant in which this device will be installed, the device according to the invention can advantageously be built so as to meet a degree of protection IP65 or higher or else a degree of protection NEMA 4 or higher. According to other embodiments, the device can meet the degrees of protection IP66 or IP67. According to further embodiments, it will be possible for the device to be built in view of installation thereof in environments that are dangerous on account of the presence of explosive gases and powders, and where other standards are to be met, such as, for example, the requirements defined by the EEx certifications (EEx d, EEx i, ENTITY, FISCO).

Said device comprises information-display means 120. Said information typically consists of data representing the values of variables corresponding to the devices connected to the network, such as, for example, the value of the temperature measured by a temperature transmitter, or else information on the state of the devices themselves, such as, for example, the information that a particular device is active, or else that said device is in an error situation.

The device according to the invention is equipped with means for logical connection of the device itself to information available on the Fieldbus network 200. According to a preferred embodiment, said means may consist of a multiple-input Function Block 1200. Said inputs may be linked, in the stage of configuration of the control system, to the various process variables that are to be monitored locally. In this way, the device, after the configuration stage, is able, by virtue of the basic mechanisms of the Fieldbus networks, to trace automatically on said Fieldbus network the information corresponding to the variables to which it has been connected in order to be able to display them subsequently.

The device according to the invention also comprises physical-display means 400. According to a preferred embodiment, said physical-display means may consist of a dot-matrix display 1400. Advantageously, the device according to the invention is also equipped with logic means for choice and display of one or more of said items of information on said physical means 300. According to a preferred embodiment, said logic means consist of an appropriate software program that gathers information from the said means for logical connection of the device and, according to appropriate logics, displays either partially or totally said information on the physical-display means. Said information may, for example, consist of the value of one or more variables present on the Fieldbus network. Display of a The display of the variable may be obtained, for example, by displaying the value thereof. Advantageously, it is also possible to display concomitantly also the Tag of the device to which said variable refers and/or the Tag of the Function Block that produces at output the variable, as this has been assigned in the commissioning stage. In this way, it is possible for an operator who reads the information on the display to understand without any ambiguity what the information displayed refers to.

The variables can be displayed one at a time, or in blocks of a certain number (depending upon the dimensions of the display) or else again in sequence (one after another, with a time interval between them, or in sequences of blocks of variables, once again with a time interval between one block and another).

The device can also be provided with a keypad 500 for a further local selection of which of the variables connected logically to the device it is desired to display and according to what sequence. For example, if the input variables are eight, it is possible to decide locally to display just the third and the seventh in an alternating way every 5 seconds because at that particular moment the operator is not interested in the other variables, and then change selection and sequence.

In the case of application in intrinsic-safety or explosion-proof environments, where removal of the cover of the transmitter in order to gain access to the keypad of the display is not allowed, it is possible to make the local selection described above also by acting on the external keys present in the housing 1502. This falls altogether within the concept expressed previously that the device must be suited for installation in industrial environments.

The device according to the invention comprises means for connection to a Fieldbus communication network 110. Such means can comprise both connection physical means (connectors and hardware circuitry, 111) and logical connection means 114.

According to a preferred embodiment, the device according to said connection logic means may contain a function for co-ordination of the Fieldbus network 113, such as, for example, a LAS function 1113. Advantageously, said LAS function may be configured for use in Backup mode, i.e., said function becomes active only if the Primary LAS of the Fieldbus system to which the device is connected ceases to function.

The advantages of integrating the display and LAS functions in a device not necessarily associated directly to a sensor or an actuator are multiple.

In fact, in traditional systems, the Backup-LAS function is implemented in devices such as, for example, transmitters. A transmitter is a device that contains a sensor, the primary function of which is to measure a given variable, carry out processing thereon, and make said measurement available to the rest of the control system. In the case where the Primary LAS ceases to function, in traditional systems either the entire Fieldbus network stops functioning or else one device, such as, for example, a transmitter, takes over the Backup-LAS function. In this way, however, this transmitter comes to be overloaded, and its performance (whether as measuring device or as LAS or for any other of the functions for which it has been designed) may prove reduced. The presence in a system of a device according to the invention enables activation, in the case of failure of the Primary LAS, of a Backup LAS without overloading other devices in the system.

Furthermore, typically, when the Primary LAS ceases to function, the possibility of gathering (and displaying) information on the console of the system is lost. In other words, it is no longer possible to verify whether the rest of the system is behaving correctly or not. The presence of the display in the device according to the invention enables display of variables regarding the system and hence control of the correctness of operation of the network even in the condition of failure of the Primary LAS.

According to a further preferred embodiment, said connection logic means can also contain means for logico-mathematical processing such as, for example, one or more Function Blocks 112, 1112. Advantageously, this characteristic can in some cases also be associated to the presence of Backup-LAS functions as described above. In this way, it is possible to assign to a device that is not already assigned to measuring functions (sensors) or actuation functions (actuators), processing and control functions defined by Function Blocks that can thus be executed without unnecessary overloading of said instruments dedicated to measurement and/or actuation.

The device thus conceived can undergo numerous modifications and variations, all falling within the scope of the inventive idea.

We claim:

1. A field device for industrial environments comprising:
   means for connection to a Fieldbus network that connects said field device and one or more additional field devices to a control system; and
   information-display means that display one or more items of information that are available on the Fieldbus network and that concerns said field device and said additional field devices,
   wherein, said information-display means further comprises physical-display means and means for logical connection of said field device and said additional field devices to said one or more items of information, and logic means for choice and display of said one or more items of information on said physical-display means.

2. The device according to claim 1, wherein said means for logical connection comprises a multiple-input Function Block.

3. The device according to claim 2, wherein the inputs of said multiple-input Function Block are connected logically to said items of information during a stage of configuration of the control system.

4. The device according to claim 1, wherein said physical-display means comprise a dot-matrix display.

5. The device according to claim 1, wherein said logic means displays information corresponding to a variable available on the Fieldbus network.

6. The device according to claim 1, wherein sad logic means displays a value of said variable and a Tag of said variable.

7. The device according to claim 6, wherein said logic means displays a Tag of the field device, wherein said Tag of said variable is generated.

8. The device according to claim 7, wherein said logic means displays a multiplicity of said items of information corresponding to one or more of the field devices available on the Fieldbus network.

9. The device according to claim 6, wherein said logic means displays a multiplicity of said items of information corresponding to one or more of the field devices available on the Fieldbus network.

10. The device according to clam 1, wherein said means for connection with the Fieldbus network comprises connection physical means and connection logic means.

11. The device according to claim 10, wherein said connection logic means comprises a scheduling function for coordinating operation of the Fieldbus network.

12. The device according to claim 11, wherein said scheduling function is a Link Active Scheduler.

13. The device according to claim 12, wherein said scheduling function is a primary Link Active Scheduler.

14. The device according to claim 11, wherein said scheduling function is activated even if said information-display means are not activated.

15. The device according to claim 11, wherein said device further comprises a keypad.

16. The device according to claim 15, wherein said logic means is activated by means of said keypad.

17. The device according to claim 10, wherein said connection logic means comprises means for processing logico-mathematical processing of information.

18. The device according to claim 17, wherein said means for processing comprises at least one Function Block.

19. The device according to claim 17, wherein said processing means is activated even if said information-display means are not activated.

* * * * *